US008461801B2

(12) United States Patent
Chen

(10) Patent No.: US 8,461,801 B2
(45) Date of Patent: Jun. 11, 2013

(54) WIRELESS CHARGING JACKET COVER COMBINED WITH A BATTERY AND WIRELESS CHARGING SYSTEM THEREOF

(75) Inventor: Ming-Yu Chen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 332 days.

(21) Appl. No.: 12/873,333

(22) Filed: Sep. 1, 2010

(65) Prior Publication Data

US 2011/0285347 A1  Nov. 24, 2011

(30) Foreign Application Priority Data

May 21, 2010  (TW) .............................. 99116282 A

(51) Int. Cl.
H01M 10/46  (2006.01)
(52) U.S. Cl.
USPC ......................................................... 320/108
(58) Field of Classification Search
USPC ........................... 320/107, 108, 112, 114, 115
See application file for complete search history.

(56) References Cited

U.S. PATENT DOCUMENTS

| 2008/0061733 A1 | 3/2008 | Toya |  |
|---|---|---|---|
| 2008/0061735 A1 | 3/2008 | Toya |  |
| 2008/0265835 A1* | 10/2008 | Reed et al. | 320/108 |
| 2010/0289450 A1* | 11/2010 | Kook | 320/108 |

FOREIGN PATENT DOCUMENTS

| CN | 1726450 A | 1/2006 |
| CN | 101401312 A | 4/2009 |
| WO | 2004055654 A2 | 7/2004 |
| WO | 2007108819 A1 | 9/2007 |

OTHER PUBLICATIONS

European search report mailed on Feb. 18, 2011 for the EP application No. 10176606.1, filing date Sep. 14, 2010, p. 1-3.
Office action mailed on Jan. 14, 2013 for the China application No. 201010194094.2, filing date May 28, 2010, p. 1-8.

* cited by examiner

Primary Examiner — Edward Tso
(74) Attorney, Agent, or Firm — Winston Hsu; Scott Margo

(57) ABSTRACT

A wireless charging jacket combined with a battery includes an induction coil, a control circuit, an isolation gasket, at least one conductive terminal, and a package material. The induction coil transforms an electromagnetic wave into an electrical energy. The control circuit performs a wireless charging operation upon the battery by using the electrical energy transformed by the induction coil. The isolation gasket is used for isolating the electromagnetic wave. The conductive terminal is coupled to the control circuit, wherein the wireless charging jacket performs the wireless charging operation upon the battery via the conductive terminal. The package material at least partially covers the battery, such that the battery is installed in the wireless charging jacket. The induction coil, the control circuit, the isolation gasket, and the conductive terminal are disposed on the package material.

10 Claims, 3 Drawing Sheets

WIRELESS CHARGING JACKET COVER COMBINED WITH A BATTERY AND WIRELESS CHARGING SYSTEM THEREOF

BACKGROUND OF THE INVENTION

1. Field of the Invention

The present invention relates to a wireless charging jacket combined with a battery and a related wireless charging system, and more particularly, to wireless charging jacket and a related wireless charging system that can be fixed to the battery by adhering or bundling.

2. Description of the Prior Art

The wireless charging technology has a breakthrough in the thinking of the traditional wired charging technology, so that users can experience a real wireless life which is convenient, energy saving, and unconstrained. However, since the wireless charging technology has a high cost, there is no large-scale use in handheld devices currently.

At present, wireless charging accessories have already been sold in the market, but most of them design the wireless charging receiver on the backplate of the handheld device. The wireless charging receiver needs to be connected to the handheld device, that is, extra terminals are required. For this reason, design modifications of the handheld device are required, which may raise the manufacturing cost. Another approach is to design the wireless charging receiver as a cover of the handheld device, and connect the wireless charging receiver to the original wired charging interface. However, the wired charging interface of the handheld device will be occupied, which causes the user another complication.

Hence, how to save manufacturing cost and bring more convenience to the user become one of important topics in this field.

SUMMARY OF THE INVENTION

It is one of the objectives of the claimed invention to provide a wireless charging jacket combined with a battery and a related wireless charging system to solve the above-mentioned problems.

According to one embodiment, a wireless charging jacket combined with a battery is provided. The wireless charging jacket includes an induction coil, a control circuit, an isolation gasket, at least one conductive terminal, and a package material. The induction coil receives an electromagnetic wave, and transforms the electromagnetic wave into an electrical energy. The control circuit is coupled to the induction coil, and performs a wireless charging operation upon the battery by using the electrical energy transformed by the induction coil. The isolation gasket is disposed in one side of the induction coil, for isolating the electromagnetic wave. The conductive terminal is coupled to the control circuit, wherein the wireless charging jacket performs the wireless charging operation upon the battery via the conductive terminal. The package material at least partially covers the battery, such that the battery is installed in the wireless charging jacket. The induction coil, the control circuit, the isolation gasket, and the conductive terminal are disposed on the package material.

In one embodiment, the package material is fixed to the battery by adhering, such that the battery is installed in the wireless charging jacket. In another embodiment, the package material has a flexibility; and the package material is fixed to the battery by bundling, such that the battery is installed in the wireless charging jacket.

According to one embodiment, a wireless charging system is provided. The wireless charging system includes a charging board and a wireless charging jacket. The charging board provides an electromagnetic wave. The wireless charging jacket is combined with a battery, and includes an induction coil, a control circuit, an isolation gasket, at least one conductive terminal, and a package material. The induction coil receives an electromagnetic wave, and transforms the electromagnetic wave into an electrical energy. The control circuit is coupled to the induction coil, and performs a wireless charging operation upon the battery by using the electrical energy transformed by the induction coil. The isolation gasket is disposed in one side of the induction coil, for isolating the electromagnetic wave. The conductive terminal is coupled to the control circuit, wherein the wireless charging jacket performs the wireless charging operation upon the battery via the conductive terminal. The package material at least partially covers the battery, such that the battery is installed in the wireless charging jacket. The induction coil, the control circuit, the isolation gasket, and the conductive terminal are disposed on the package material.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
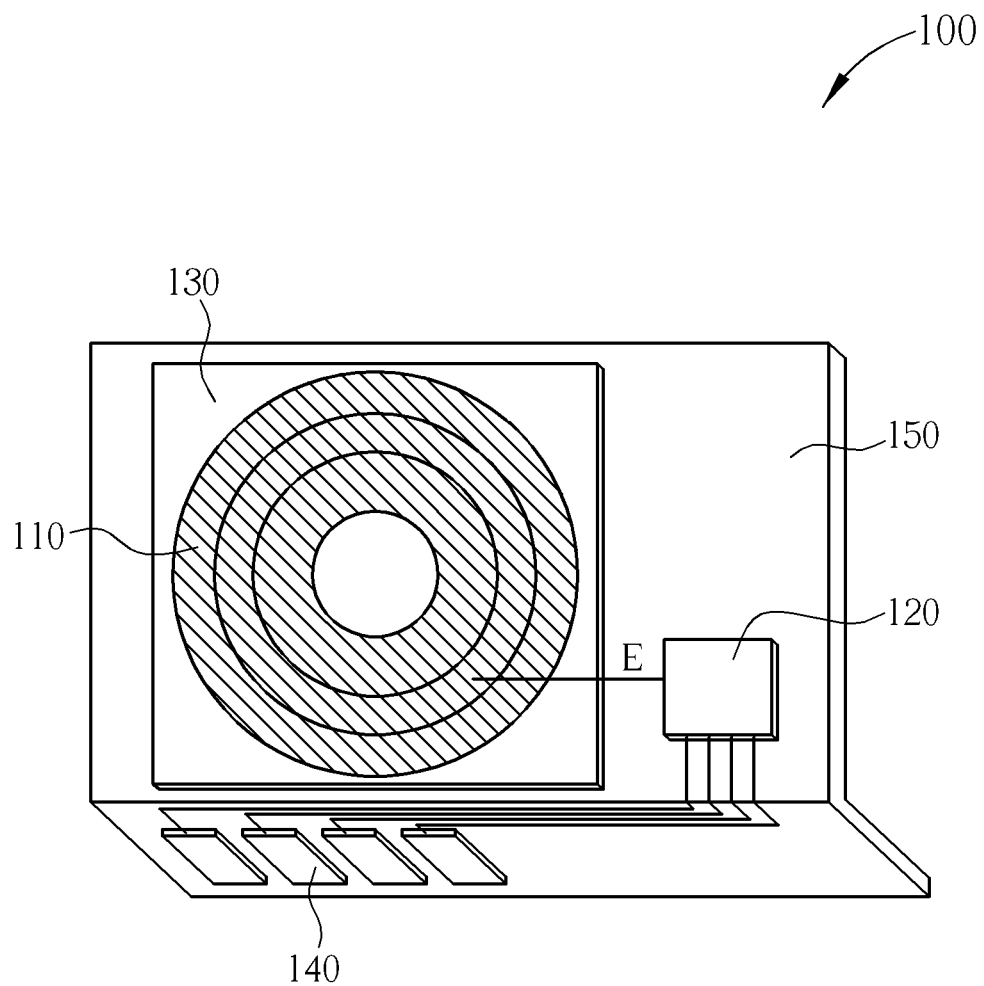
FIG. 1 is a diagram of a wireless charging jacket according to an embodiment of the present invention.
Figure 2:
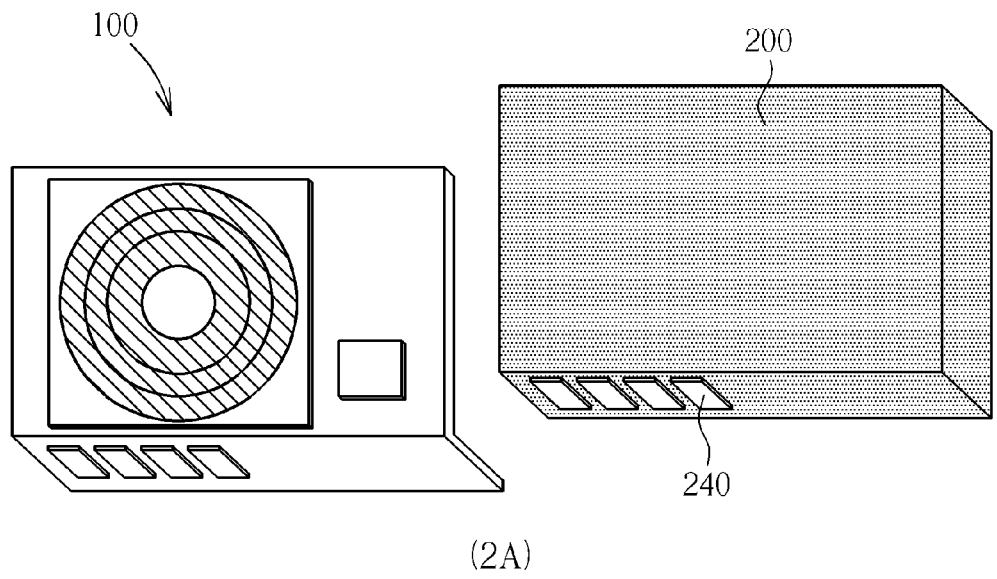
FIG. 2 (including 2A and 2B) is a diagram illustrating a condition before the wireless charging jacket shown in FIG. 1 is combined with a battery and a condition after the wireless charging jacket has been combined with the battery.
Figure 2:
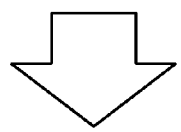
Figure 2:
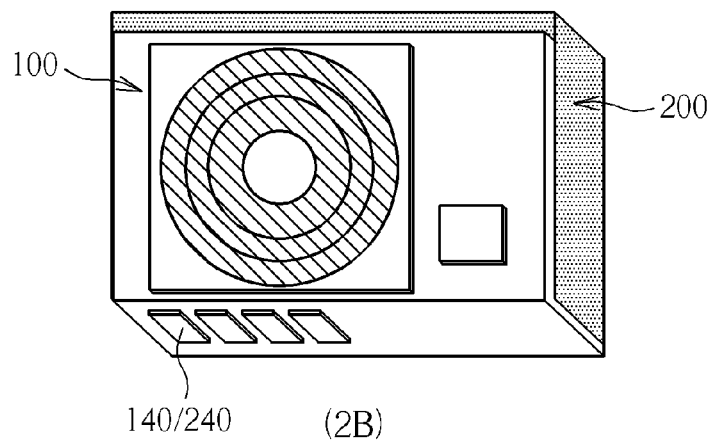
Figure 3:
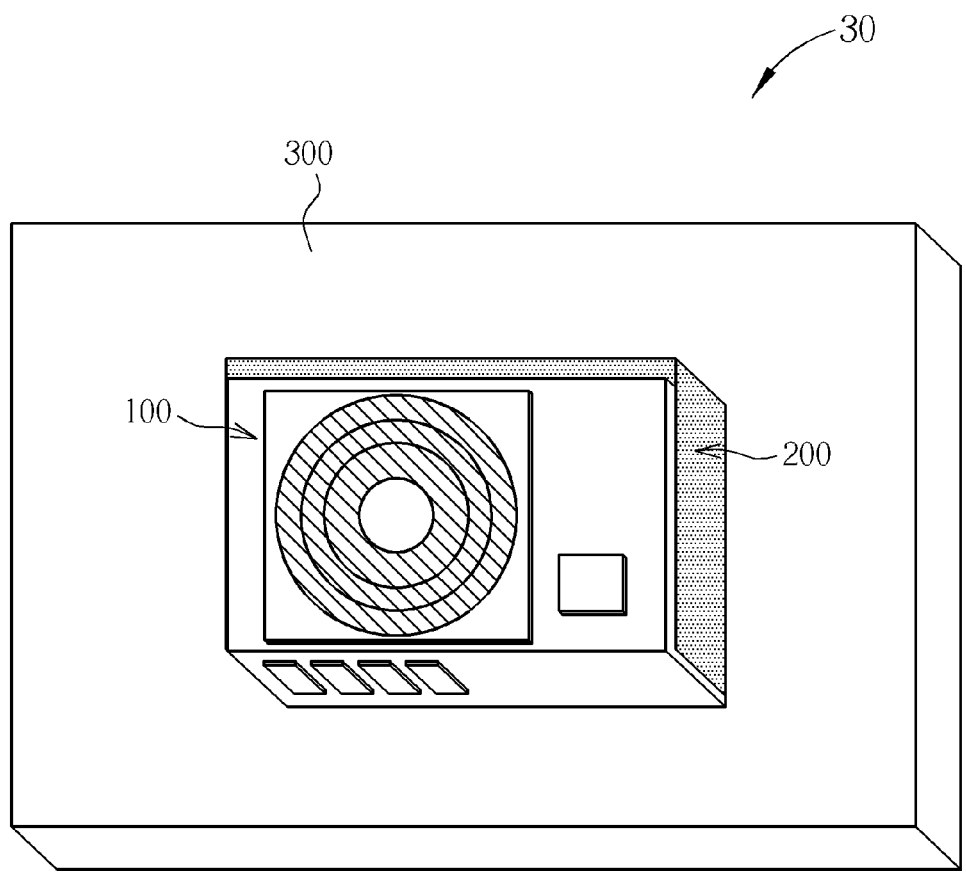
FIG. 3 is a diagram of a wireless charging system according to an embodiment of the present invention.

Please refer to FIG. 1. FIG. 1 is a diagram of a wireless charging jacket 100 according to an embodiment of the present invention. Please note that the wireless charging jacket 100 is used to be combined with a battery, and performs a wireless charging operation upon the battery by way of electromagnetic induction. As FIG. 1 depicts, the wireless charging jacket 100 includes, but is not limited to, an induction coil 110, a control circuit 120, an isolation gasket 130, at least one conductive terminal 140, and a package material 150. The induction coil 110 receives an electromagnetic wave (not shown), and transforms the electromagnetic wave into an electrical energy E. The control circuit 120 is coupled to the induction coil 110, and controls the induction coil 110 and performs a wireless charging operation upon a battery (e.g., the battery as shown in FIG. 2 and FIG. 3) by using the electrical energy E transformed by the induction coil 110. The isolation gasket 130 is disposed in one side of the induction coil 110, for isolating the electromagnetic wave. The conductive terminal 140 is coupled to the control circuit 120, wherein the wireless charging jacket 100 performs the wireless charging operation upon the battery via the conductive terminal 140. Moreover, the package material 150 at least partially covers the battery, such that the battery is installed in the wireless charging jacket 100, as is also shown in FIG. 2 and FIG. 3. The induction coil 110, the control circuit 120, the isolation gasket 130, and the conductive terminal 140 are disposed on the package material 150.

What calls for special attention is that in one embodiment, the package material 150 can be fixed to the battery (as is shown in FIG. 2) by adhering, such that the battery is installed in the wireless charging jacket 100, but this is not meant to be a limitation of the present invention. In another embodiment, the package material may have a flexibility; and the package material 150 can be fixed to the battery by bundling, such that the battery is installed in the wireless charging jacket 100. Those skilled in the art should appreciate that various modifications of ways for fixing the package material 150 to the battery may be made without departing from the spirit of the present invention, which also belongs to the scope of the present invention. Please also note that: the above-mentioned isolation gasket 130 may be implemented by a high magnetic permeability material or any other material that can change magnetic lines of force, in order to avoid the electromagnetic wave being interfered by other metals.

Please refer to FIG. 2. FIG. 2 (including 2A and 2B) is a diagram illustrating a condition before the wireless charging jacket 100 shown in FIG. 1 is combined with a battery 200 and a condition after the wireless charging jacket 100 has been combined with the battery 200. 2A represents a condition that the wireless charging jacket 100 has not been combined with the battery 200 yet, while 2B represents another condition that the wireless charging jacket 100 has been combined with the battery 200. As shown in 2A, the battery 200 also includes a plurality of second conductive terminals 240. As shown in 2B, after the battery 200 is installed in the wireless charging jacket 100, the conductive terminal 140 of the wireless charging jacket 100 directly contacts the second conductive terminal (s) 240 of the battery 200.

Moreover, as one skilled in the art know, when the battery 200 is installed in a handheld device (such as, a mobile phone, a PDA, a PDA phone, a game console, or a camera), the second conductive terminal 240 of the battery 200 is electronically connected to the device battery connector of the handheld device. In other words, after the battery 200 is combined with the wireless charging jacket 100, and both of the combined battery and the wireless charging jacket 100 are then installed in the handheld device, the conductive terminal 140 of the wireless charging jacket 100 will be electronically connected to the second conductive terminal 240 of the battery as well as the device battery connector of the handheld device, i.e., directly contacts with them.

As can be known from FIG. 2, the wireless charging jacket 100 disclosed in the present invention is able to be fixed to the battery 200 by adhering or bundling, such that the battery 200 is installed in the wireless charging jacket 100. As a result, the wireless charging jacket 100 can perform a wireless charging operation upon the battery 200 by way of electromagnetic induction. That is to say, it is possible to make the handheld device and the battery have wireless charging functions without modifying original designs of the handheld device and the battery. What's more, since the wireless charging jacket 100 disclosed in the present invention is designed with the conductive terminal 140, which can be used to be electrically connected to the second conductive terminal 240 of the battery as well as the device battery connector of the handheld device, the original wired charging interface of the handheld device won't be occupied.

Please also note that in this embodiment, the package material 150 of the wireless charging jacket 100 partially covers the battery 200, but the present invention is not limited to this only. In other embodiments, the package material of the wireless charging jacket 100 can completely cover the battery 200, which also belongs to the scope of the present invention.

Please refer to FIG. 3. FIG. 3 is a diagram of a wireless charging system 30 according to an embodiment of the present invention. As shown in FIG. 3, the wireless charging system 30 includes a charging board 300 and a wireless charging jacket 100, wherein the wireless charging jacket 100 is used to be combined with the battery 200. The architecture and operations of the wireless charging jacket 100 and the battery have already detailed above (please also see FIG. 1 and FIG. 2), and further description is omitted here for brevity. The charging board 300 is used for providing an electromagnetic wave (not shown) to the wireless charging jacket 100. In one word, when the battery 200 is installed in the wireless charging jacket 100 by a user, and then the combined battery 200 and the wireless charging jacket 100 are put on the charging board 300 together, the wireless charging system 30 (including the wireless charging jacket 100 and the charging board 300) can perform the wireless charging operation upon the battery 200 by way of electromagnetic induction.

Please note that: in this embodiment, the combined wireless charging jacket 100 together with the battery 200 are directly put on the charging board 300, such that the wireless charging system 300 can perform the wireless charging operation upon the battery 200, but this should not be considered as a limitation of the present invention. In other embodiments, the combined wireless charging jacket 100 and the battery 200 can be first installed in a handheld device by a user, and then the handheld device together with the combined battery 200 and the wireless charging jacket 100 are put on the charging board 300 together. Under this condition, the wireless charging system 30 is able to perform the wireless charging operation upon the batter 200 being installed in the handheld device.

The abovementioned embodiments are presented merely for describing features of the present invention, and in no way should be considered to be limitations of the scope of the present invention. In summary, the present invention provides a wireless charging jacket combined with a battery and a related wireless charging system. The wireless charging jacket 100 disclosed in the present invention is able to be fixed to the battery 200 by adhering or bundling, such that the battery 200 is installed in the wireless charging jacket 100. As a result, the wireless charging jacket 100 can perform a wireless charging operation upon the battery 200 by way of electromagnetic induction. In other words, it is possible to make the handheld device or the battery have wireless charging functions without modifying original designs of the handheld device and the battery. Additionally, since the wireless charging jacket 100 disclosed in the present invention is designed with the conductive terminal 140, which can be used to be electrically connected to the second conductive terminal 240 of the battery as well as the device battery connector of the handheld device, the original wired charging interface of the handheld device won't be occupied. Moreover, the wireless charging jacket 100 and/or the wireless charging system 30 disclosed in the present invention can be suitable to not only a condition that the wireless charging operation is directly performed upon the combined battery 200 and the wireless charging jacket 100, but also a condition that the wireless charging operation is performed by putting the handheld device together with the combined battery 200 and the wireless charging jacket 100 on the charging board 300. Therefore, the wireless charging jacket 100 and the wireless charging system 30 may provide more additional features to the handheld device and bring more convenience to the users.

Those skilled in the art will readily observe that numerous modifications and alterations of the device and method may be made while retaining the teachings of the invention.

What is claimed is:

1. A wireless charging jacket combined with a battery, the wireless charging jacket comprising:

an induction coil, for receiving an electromagnetic wave and for transforming the electromagnetic wave into an electrical energy;

a control circuit, coupled to the induction coil, for controlling the induction coil and for performing a wireless charging operation upon the battery by using the electrical energy transformed by the induction coil;

an isolation gasket, disposed in one side of the induction coil, for isolating the electromagnetic wave;

at least one conductive terminal, coupled to the control circuit, wherein the wireless charging jacket performs the wireless charging operation upon the battery via the conductive terminal; and a package material, at least partially covering the battery, such that the battery is installed in the wireless charging jacket; wherein the induction coil, the control circuit, the isolation gasket, and the conductive terminal are disposed on the package material.

2. The wireless charging jacket of claim 1, wherein the package material completely covers the battery.

3. The wireless charging jacket of claim 1, wherein the package material is fixed to the battery by adhering, such that the battery is installed in the wireless charging jacket.

4. The wireless charging jacket of claim 1, wherein the package material has a flexibility; and the package material is fixed to the battery by bundling, such that the battery is installed in the wireless charging jacket.

5. The wireless charging jacket of claim 1, wherein after the battery is installed in the wireless charging jacket, the conductive terminal directly contacts a second conductive terminal of the battery.

6. The wireless charging jacket of claim 1, wherein the isolation gasket is a high magnetic permeability material.

7. A wireless charging system, comprising:
a charging board, for providing an electromagnetic wave; and
a wireless charging jacket, combined with a battery, the wireless charging jacket comprising:
an induction coil, for receiving the electromagnetic wave and for transforming the electromagnetic wave into an electrical energy;
a control circuit, coupled to the induction coil, for controlling the induction coil and for performing a wireless charging operation upon the battery by using the electrical energy transformed by the induction coil;
an isolation gasket, disposed in one side of the induction coil, for isolating the electromagnetic wave;
at least one conductive terminal, coupled to the control circuit, wherein the wireless charging jacket performs the wireless charging operation upon the battery via the conductive terminal; and
a package material, at least partially covering the battery, such that the battery is installed in the wireless charging jacket; wherein the induction coil, the control circuit, the isolation gasket, and the conductive terminal are disposed on the package material.

8. The wireless charging system of claim 7, wherein the package material is fixed to the battery by adhering, such that the battery is installed in the wireless charging jacket.

9. The wireless charging system of claim 7, wherein the package material has a flexibility; and the package material is fixed to the battery by bundling, such that the battery is installed in the wireless charging jacket.

10. The wireless charging system of claim 7, wherein after the battery is installed in the wireless charging jacket, the conductive terminal directly contacts a second conductive terminal of the battery.

* * * * *